United States Patent [19]

Korsmeier et al.

[11] Patent Number: 5,333,591
[45] Date of Patent: Aug. 2, 1994

[54] DEVICE TO CONTROL A GAS-FIRED APPLIANCE

[75] Inventors: Wilhelm Korsmeier, Recklinghausen; Dieter Wolf; Manfred Hoppe, both of Dorsten; Holns J. Schollmeyer, Raesfeld, all of Fed. Rep. of Germany

[73] Assignee: Ruhrgas Aktiengesellschaft, Essen, Fed. Rep. of Germany

[21] Appl. No.: 28,249

[22] Filed: Mar. 10, 1993

[30] Foreign Application Priority Data

Mar. 18, 1992 [DE] Fed. Rep. of Germany ... 9203528[U]

[51] Int. Cl.$^5$ .............................................. F02M 21/04
[52] U.S. Cl. .................................... 123/527; 123/704; 73/23.32; 73/25.03; 431/76
[58] Field of Search ................ 73/23.32, 23.31, 25.03; 123/527, 575, DIG. 12, 3, 704; 431/76

[56] References Cited

U.S. PATENT DOCUMENTS

| | | | |
|---|---|---|---|
| 4,198,939 | 4/1980 | Masaki | 123/704 |
| 4,241,019 | 12/1980 | Nakatani et al. | 73/23.31 |
| 4,412,444 | 11/1983 | Ketel, II | 73/23.32 |
| 4,659,306 | 4/1987 | Altemark et al. | 431/76 |
| 4,817,414 | 4/1989 | Hagen et al. | 73/23.31 |
| 4,823,760 | 4/1989 | Nishida | 123/704 |
| 4,902,138 | 2/1990 | Goeldner et al. | 73/25.03 |
| 4,918,974 | 4/1990 | Hachey et al. | 73/25.03 |

FOREIGN PATENT DOCUMENTS 1529094 12/1989 U.S.S.R. .............................. 73/23.31

*Primary Examiner*—E. Rollins Cross
*Assistant Examiner*—Erick Solis
*Attorney, Agent, or Firm*—Blakely, Sokoloff, Taylor & Zafman

[57] ABSTRACT

A device to control a gas-fired appliance as a function of the composition of a gaseous fuel. The device includes a thermal conductivity sensor emitting a measurement signal dependent upon the thermal conductivity of the gaseous fuel. An analyzing unit receives the measurement signal and uses it to develop a control signal dependent upon the composition of the gaseous fuel. A control unit receives the control signal and uses it to control the operating parameters of the gas-fired appliance, in the case of a gas engine particularly the parameters of air/fuel ratio, output and angle of advance. The analyzing unit may include an input interface into which data on the type of gaseous fuel components may be entered, which are used for the generation of the control signal. Preferably the control signal is proportional to the available methane number of the gaseous fuel, whereby the operating parameters of the gas engine are controlled so that the methane number required is adjusted to the methane number available. This leads in particular to an improvement in the knocking behavior of the gas engine.

13 Claims, 2 Drawing Sheets

DEVICE TO CONTROL A GAS-FIRED APPLIANCE

BACKGROUND OF THE INVENTION

1. Field of the Invention

The present invention relates to a device to control a gas-fired appliance, in particular a gas engine, as a function of the composition of a gaseous fuel.

2. Prior Art

Gas engines are used to an increasing extent in packaged cogeneration systems for local power and heat energy supplies. In this connection, questions of engine operation in existing plants and the selection and/or design of future engine units are also dependent upon the properties of the gaseous fuel supplied. For internal combustion gaseous fuels must meet certain requirements, such as sufficient energy content and high knock resistance. A fuel too low in knock resistance leads to knocking combustion, possibly causing serious damage to the engine and increased pollutant emissions. The decisive criterion for rating the knock resistance of gaseous fueles is the methane numbered (MN). The gaseous fuel supplied to the gas engine has an available methane number (MNA) dependent upon its composition. In public gas supplies today almost exclusively natural gas is used, albeit with varying properties. For peak shaving, local gas utilities blend natural gas with liquid petroleum gas and/or petroleum gas/air mixtures. This measure naturally influences the gas properties, in particular the MNA of the gaseous fuel. To ensure safe engine operation the MNA must always be at least equal to the methane number requirement (MNR) of the gas engine. The methane number required by the engine is affected by design and operating parameters, with the adjustment of the MNR being achieved by changing engine operation. Changes in ignition timing, air/fuel ratio and output are effective measures to reduce the MNR at a decreasing MNA of the gaseous fuel.

The dependence of safe operation upon the properties of the gaseous fuel is also of major importance for other gas-fired appliances, such as burner arrangements.

THE INVENTION

The object of the present invention is to create a device for the control of a gas-fired appliance which controls the operation parameters of the gas-fired appliance as a function of the composition of the gaseous fuel supplied.

According to the present invention, this object is achieved by a device characterized by the features according Claim 1.

To determine changes in properties of the gaseous fuel, gas sensors arranged in the proximity of the gas appliance may be used. If the type of the gaseous fuel i.e. of the base gas (for example type of natural gas) and the admixed gases (for example liquid petroleum gas/air mixture) is known, the present invention proposes to use a sensor operating on the basis of the thermal conductivity principle for determining the gas properties. As compared to a gas chromatography generally used in exact gas analyses, the thermal conductivity sensor suitable for use under the conditions described has several advantages: The sensor helps to realize a short response time for detecting changes in gas properties; it is substantially cheaper; it produces a continuously measured value; measured value analysis may be automated; and the result of said analysis may be used immediately to control the gas-fired appliance.

The determination of the concentrations of gas compositions by using said thermal conductivity sensor is most accurate if (a) the gas mixture consists of only two components, (b) the gas mixture consists of more than two components but changes in concentration occur only in respect of two components or if (c) the gas mixture consists of more than two components, but the relevant gas components have a highly differing thermal conductivities. The latter requirement for determining changes in concentration by using thermal conductivity measurements is met when liquid petroleum gas/air mixtures are blended with natural gas. Natural gas (with its main component being methane) has a substantially higher thermal conductivity than butane or propane/air mixtures.

If the gas-fired appliance is fed from a gas utility grid, there are data available on the type admixed to the gaseous fuel. Preferably, the analyzing unit of the device proposed by the present invention may include an input interface, into which data on the type of gaseous fuel components may be entered (said data corresponding to the gas utility data) to generate from said data an input signal, as well as a processing unit to combine said input signal with the measurement signal.

The device proposed by the present invention is preferably designed in such a way that the control signal is proportional to the available methane number of the gaseous fuel and that the control of the operating parameters of the gas-fired appliance adjusts the methane number required to the methane number available. Controlling the methane number required by the gas-fired appliance as a function of the available methane number of the gaseous fuel is the most simple and effective measure to achieve a safe operating mode of the gas-fired appliance, in particular to improve the knocking behavior of a gas engine.

In a preferred embodiment of the present invention the analyzing unit include a delay module, said module time-delaying the control signal against the measurement signal. The time delay of the control signal controlling the control unit allows compensation of the time delay caused by gas flow and occurring between measurement value determination and gas combustion.

Further, a preferred embodiment of the present invention proposes that the control unit may include an integrated microprocessor unit for storing envelope data and operating concepts of the gas-fired appliance as a function of gas properties, pollutant emissions as well as output and efficiency of the gas-fired appliance. If the gas-fired appliance is a gas engine, a particularly preferable embodiment proposes to include at least one knock sensor and to include in the engine control unit an electronic knock sensor analyzer for processing the knock sensor signals for controlling the gas engine operating parameters. The gas engine control is designed so that the operating parameters are pre controlled dependent upon gas properties, with further control based on the resulting operating point being a function of knock intensity.

As an additional control feature a limit value monitoring device is preferably envisaged for the control signal between the analyzing unit and the control unit.

BRIEF DESCRIPTION OF THE DRAWINGS

In the following, the present invention will be revealed in more detail on the basis of a design variant in the drawing wherein.

DETAILED DESCRIPTION OF THE INVENTION

Figure 1:
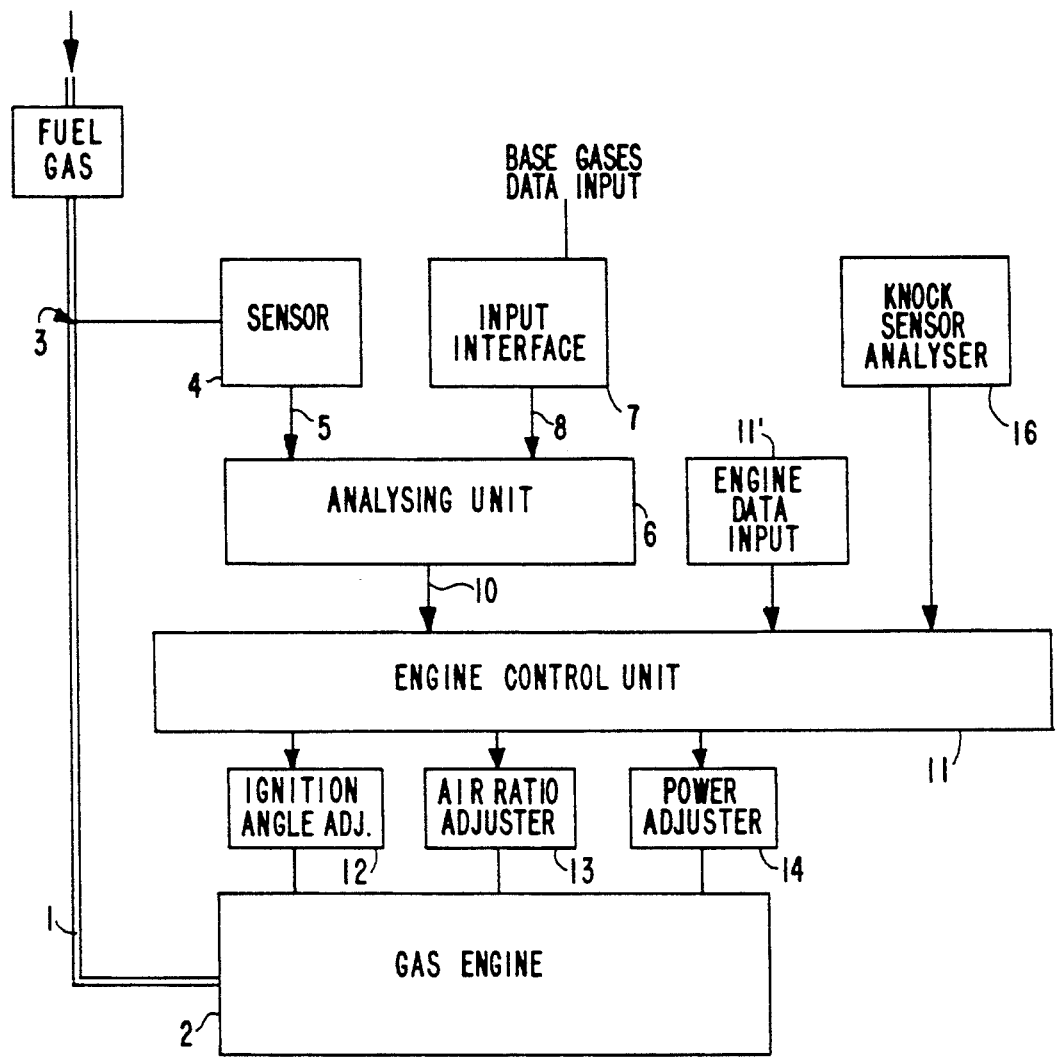
FIG. 1 shows a block diagram of a gas engine with a control unit according to the present invention.

As FIG. 1 shows, the gaseous fuel is fed through a line 1 to a gas engine 2. At a measuring point 3 a sensor 4 measures the thermal conductivity of the gaseous fuel and sends a measurement signal proportional to the thermal conductivity measured to an analyzing unit 6 via a line 5. An input interface 7 allows the input of the type of base components of the gaseous fuel. On the basis of the data supplied by the gas utility the operator may enter at this point which type of natural gas is used and which liquid petroleum gas/air mixtures have been added by the gas utility. The input interface 7 sends an input signal to the analyzing unit 6 via a line 8. The analyzing unit 6 combines the measurement signal and the input signal to generate a control signal which is proportional to the available methane number of the gaseous fuel and sends it to an engine control unit 11 via a line 10. Said unit receives the control signal and uses the advance angle, air/fuel ratio and output adjustments 12, 13 and/or 14 to control the operating parameters of the gas engine 2. The engine control unit 11 moreover allows the input of engine data according to the data of the engine manufacturer, i.e. design data and operating data. The engine control unit 11 further includes a microprocessor unit 11' for storing manufacturer's engine data, i.e. envelopes and operating concepts of gas engine 2, as a function of gas properties, pollutant emissions as well as output and efficiency of the gas engine. Via the control of the advance angle, air/fuel ratio and output it is possible to control the methane number required by the gas engine and thereby to influence the knocking behavior of the engine. On the basis of the control data supplied by sensor 4 and input interface 7 via analyzing unit 6, the engine control unit 11 uses adjustments 12, 13 and/or 14 to set an operating point reflecting actual gaseous fuel properties. A knock sensor 15 added to the gas engine supplies a signal dependent upon the engine vibration behavior to a knock sensor analyzer 16. Said analyzer analyses the gas engine vibration behavior and identifies knocking engine operation in good time. The output signal of the knock sensor analyzer 16 is also fed to engine control unit 11 to control the operating parameters (angle of advance, air/fuel ratio and output) also as a function of the actual knock behavior of gas engine 2. The knock sensor analyzer 16 may also be an integral part of engine control unit 11.

Figure 2:
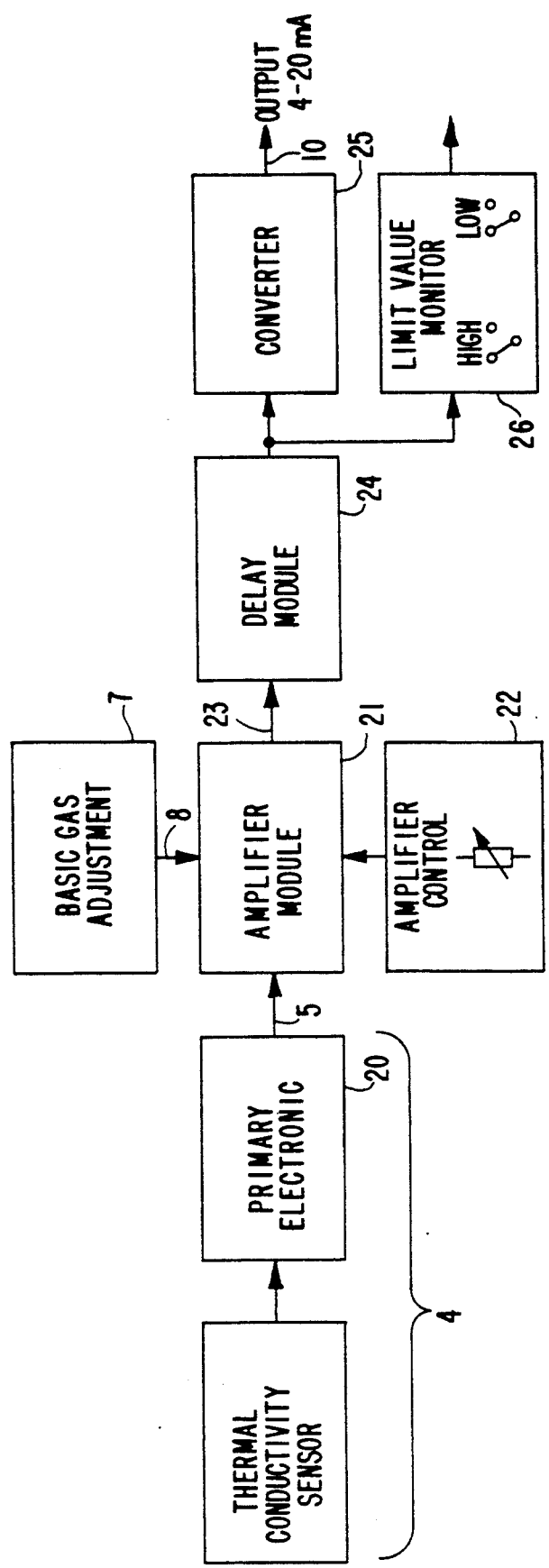
FIG. 2 shows a block diagram depicting a sensor with primary electronics and an analyzing unit of the device described by the present invention.

In the following the design and function of sensor 4 and the electronic modules of analyzing unit 6 and input interface 7 will be explained in more detailed on the basis of FIG. 2.

A thermal conductivity sensor is accommodated in a housing with male thread and is installed at measuring point 3 on fuel line 1. The measuring resistance elements of the gas thermal conductivity sensor are cable-connected to a primary electronics module 20. Said sensor primary electronics module 20 supplies power, processes the resistance measurements of said measuring resistance elements and fulfills the functions of compensation, linearisation and amplification. In particular, it compensates the variations in the temperature of the gaseous fuel to be measured and in ambient temperature. At the output of primary electronics module 20 there is a measurement signal available which is proportional to the thermal conductivity of the gaseous fuel at measuring point 3. It should be noted that the measurement signal available in line 5 responds to changes in the thermal conductivity of the gaseous fuel at measuring point 3 with a time delay of approx. 1 second.

The measurement signal proportional to the thermal conductivity of the gaseous fuel is supplied to a non-linear amplifier module 21 via line 5, the output of said amplifier module providing a signal proportional to the available methane number of the gaseous fuel. The magnitude of the output signal of said amplifier module may be influenced by using the amplifier control 22. Moreover, the non-linear amplification function is influenced by the input signal of output interface 7 available in line 8. The input interface 7 allows the input of data on the base components of the natural gas and the liquid petroleum gas/air admixtures supplied by the gas utility.

The output signal of amplifier module 21 proportional to the available methane number is forwarded to a delay module 24 via line 23. The delay module 24 allows time-delaying of the signal to compensate the time delay occurring between the measurement of the gaseous fuel thermal conductivity at measuring point 3 and the combustion of the gas in gas engine 2. This delay is a function of the time required by the gaseous fuel to flow from measuring point 3 through line 1 to the combustion chamber of gas engine 2. Subsequently, the time-delayed signal proportional to the available methane number of the gaseous fuel is supplied to a voltage-to-current converter 25, a current of approx. 4 to 20 mA proportional to the available methane number of the gaseous fuel being present at the output of said converter in line 10 as control signal. Said control signal is subsequently supplied to engine control unit 11 via line 10 as shown in FIG. 1. Further, a limit value monitoring circuit 26 allows monitoring of a lower limit value and an upper limit value of the output voltage of delay module 24, said voltage being proportional to the available methane number of the gaseous fuel. The limit value monitoring signal at the output of the limit value monitoring circuit 26 may be used to stop the gas engine if the values measured are above or below said limit values. This is an additional safety feature in engine control.

The idea of the present invention allows for several alternative design variants of engine control, in particular the electronic analyzing unit 6. For example, an analog-to-digital converter may be used downstream of the sensor primary electronics module 20 to convert the signal proportional to the thermal conductivity of the gaseous fuel into a digital signal. Then the complete engine control device may be designed on a digital basis, wherein a microprocessor may be used to process the data measured and entered.

What is claimed as new and desired to be secured by letters patent of the United States is:

1. A device to control a gas-fired appliance as a function of the composition of a gaseous fuel, said device comprising:

a thermal conductivity sensor to supply a measurement signal dependent upon the thermal conductivity of the gaseous fuel, an analyzing unit connected to said thermal conductivity sensor to receive the measurement signal and to develop from said measurement signal a control signal dependant upon the composition of the gaseous fuel, and a control unit to receive the control signal and to control at least one of the operating parameters of the gas-fired appliance, in particular at least one of the parameters of air/fuel ratio and output, as a function of the control signal.

2. A device according to claim 1 wherein said analyzing unit includes an input interface, into which data on the type of gaseous fuel components may be entered to generate from said data an input signal, as well as a processing unit to combine said input signal with the measurement signal.

3. A device according to claim 1 or 2 wherein said analyzing unit includes a delay module, time-delaying the control signal against the measurement signal.

4. A device according to claim 1 or 2 wherein the control unit includes a microprocessor unit for storing envelopes and operating concepts of the gas fired appliance as a function of gas properties, pollutant emissions as well as output and efficiency of the gas-fired appliance.

5. A device according to claim 1 or 2 wherein a limit value monitoring unit for the control signal is located between the analyzing unit and the control unit.

6. A device to control a gas-fired appliance as a function of the composition of a gaseous fuel, said device comprising:

a thermal conductivity sensor to supply a measurement signal dependant upon the thermal conductivity of the gaseous fuel, an analyzing unit connected to the thermal conductivity sensor to receive the measurement signal and to develop from said measurement signal a control signal dependent upon the composition of the gaseous fuel, wherein said analyzing unit includes a delay module, time-delaying the control signal against the measurement signal, a control unit to receive the control signal and to control at least one of the operating parameters of the gas-fired appliance, in particular at least one of the parameters of air/fuel ratio and output, as a function of the control signal, and a limit value monitoring unit for the control signal between said analyzing unit and said control unit.

7. A device to control a gas engine as a function of the composition of a gaseous fuel, said device comprising:

a thermal conductivity sensor to supply a measurement signal dependent upon the thermal conductivity of the gaseous fuel, an analyzing unit connected to the thermal conductivity sensor to receive the measurement signal and to develop from said measurement signal a control signal dependent upon the composition of the gaseous fuel, and an engine control unit to receive the control signal and to control at least one of the operating parameters of the gas engine, in particular at least one of the parameters of air/fuel ratio, output and angle of advance, as a function of said control signal.

8. A device according to claim 6 wherein said analyzing unit includes an input interface, into which data on the type of gaseous fuel components may be entered to' generate from said data an input signal, as well as a processing unit to combine said input signal with the measurement signal.

9. A device according to claim 6 or 7 wherein said analyzing unit includes a delay module, time-delaying the control signal against the measurement signal.

10. A device according to claim 7 or 8 characterized in that the engine control unit includes a microprocessor unit for storing envelope data and operating concepts of the gas engine as a function of gas properties, pollutant emissions as well as output and efficiency of the gas engine.

11. A device according to claim 7 or 8 characterized in that at least one knock sensor is included and the engine control unit includes an electronic knock sensor analyzer for processing the knock sensor signals for controlling the gas engine operating parameters.

12. A device according to claim 7 or 8 wherein a limit value monitoring unit for the control signal is located between said analyzing unit and said engine control unit.

13. A device to control a gas engine as a function of the composition of a gaseous fuel, said device comprising:

a thermal conductivity sensor to supply a measurement signal dependent upon the thermal conductivity of the gaseous fuel, an analyzing unit connected to the thermal conductivity sensor to receive the measurement signal and to develop from said measurement signal a control signal dependent upon the composition of the gaseous fuel, wherein said analyzing unit includes a delay module, time-delaying the control signal against the measurement signal, an engine control unit to receive the control signal and to control at least one of the operating parameters of the gas engine, in particular at least one of the parameters of air/fuel ratio, output and angle of advance, as a function of the control signal, and a limit value monitoring unit for the control signal between said analyzing unit and said engine control unit.

* * * * *